United States Patent
Sandstede et al.

(10) Patent No.: US 8,172,503 B2
(45) Date of Patent: May 8, 2012

(54) TURBOMACHINE

(75) Inventors: Heiko Sandstede, Cologne (DE); Werner Bosen, Cologne (DE)

(73) Assignee: Atlas Copco Energas GmbH, Cologne (DE)

( * ) Notice: Subject to any disclaimer, the term of this patent is extended or adjusted under 35 U.S.C. 154(b) by 1214 days.

(21) Appl. No.: 11/891,497

(22) Filed: Aug. 10, 2007

(65) Prior Publication Data

US 2008/0038109 A1   Feb. 14, 2008

(30) Foreign Application Priority Data

Aug. 12, 2006   (DE) .................... 10 2006 037 821

(51) Int. Cl.
*F01D 3/00*   (2006.01)

(52) U.S. Cl. ................ 415/110; 417/407; 384/107

(58) Field of Classification Search .............. 384/107, 384/111; 415/110, 111, 229; 417/407
See application file for complete search history.

(56) References Cited

U.S. PATENT DOCUMENTS

| | | | | |
|---|---|---|---|---|
| 3,038,318 A | * | 6/1962 | Hanny | 62/192 |
| 3,740,163 A | * | 6/1973 | Schinnerer et al. | 415/111 |
| 3,828,610 A | * | 8/1974 | Swearingen | 73/862.49 |
| 4,786,238 A | | 11/1988 | Glaser et al. | |
| 4,848,932 A | * | 7/1989 | Puetz | 384/113 |
| 5,102,305 A | * | 4/1992 | Bescoby et al. | 417/407 |

FOREIGN PATENT DOCUMENTS

DE   87 17 441 U1   12/1988

* cited by examiner

*Primary Examiner* — Edward Look
*Assistant Examiner* — Ryan Ellis
(74) *Attorney, Agent, or Firm* — Collard & Roe, P.C.

(57) ABSTRACT

A turbomachine has a shaft mounted in a shaft housing, and a rotor in a rotor housing at one end of the shaft, for compression, expansion, or transport of a working gas. The shaft is mounted by hydrostatic, gas-lubricated bearings that have a connector to a compressed gas line that is connected with a pressure region of the turbomachine. A portion of the gas that is passed from the pressure region is applied to the bearing. The shaft is mounted so that the bearing effect is at least extensively independent of the rotational speed of the shaft, thereby guaranteeing support of the shaft during startup of the turbomachine, and good rigidity and low sensitivity to pressure surge stresses. The pressure in the connector to the compressed gas line is at least 5 bar greater than the pressure in the region of the ventilation connector.

5 Claims, 2 Drawing Sheets

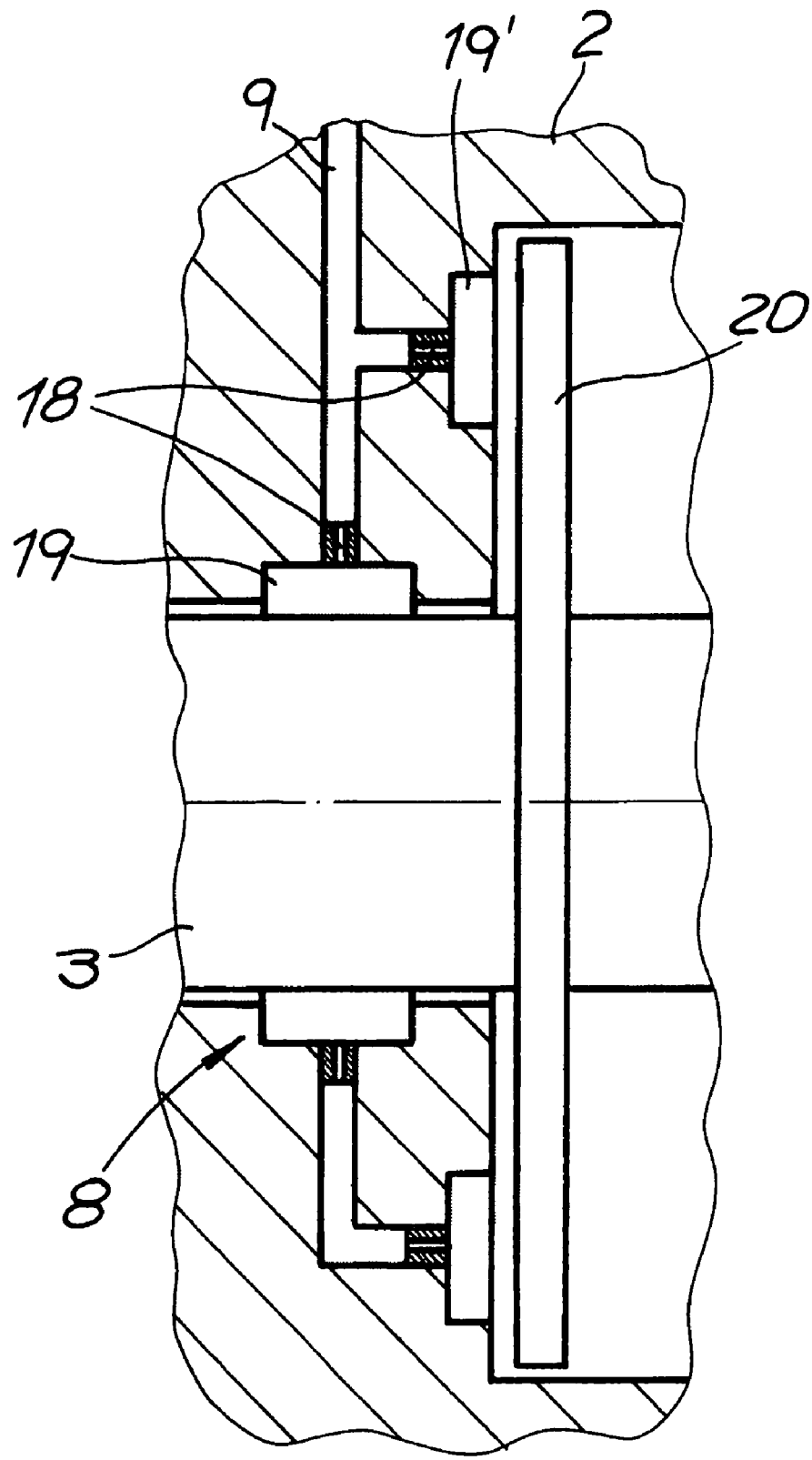

TURBOMACHINE

BACKGROUND OF THE INVENTION

1. Field of the Invention

The invention relates to a turbomachine having a shaft mounted in a shaft housing, and at least one rotor disposed in a rotor housing, overhung at one end of the shaft, for compression, expansion, or transport of a working gas. The bearings have a connector to a compressed gas line that is connected with the pressure region of the turbomachine. A portion of the working gas that is passed from the pressure region through the compressed gas line is applied to the bearings, and the shaft housing has a ventilation connection. The turbomachine can be used, for example, as a compressor, expander, or also as a combined compressor/expander arrangement, for various gas processes such as gas treatment, gas purification, energy production, and, in particular, cryogenic air fractionation.

2. The Prior Art

A turbocompressor for high-temperature applications is described in U.S. Pat. No. 4,786,238, wherein the shaft is mounted in the shaft housing axially and radially by means of hydrodynamic, gas-lubricated bearings. The bearing effect is achieved in that bearing gaps remain between bearing surfaces of shaft housing and shaft that are assigned to one another, which gaps are typically a few micrometers wide. The hydrodynamic bearings, which are also referred to as aerodynamic bearings in the case of lubrication with air, take advantage of the effect of self-lubrication. A slide film is formed hydrodynamically between the bearing surfaces that are assigned to one another, at a sufficiently high relative velocity. In order to implement as small a bearing gap as possible, the hydrodynamic bearings described in U.S. Pat. No. 4,786,238 have bearing shell structures that are resilient, i.e. make resilient contact, and deform and adapt automatically under the lubricant film pressure that is in effect. For cooling the bearings, these can have a slight gas stream applied to them. However, this gas exchange does not lead to any change in the bearing properties. Since the lubricant effect only starts at a high speed of rotation, a slide coating of the bearing surfaces that are assigned to one another is provided in the case of the embodiment described. This coating reduces the friction of the bearing surfaces that are in frictional contact with one another, in certain segments, when the turbomachine is started up. Hydrodynamic bearings are sensitive to pressure surge stresses, which are unavoidable in the case of disruptions or load changes, for example. Because of the slight bearing gap, direct material contact of the bearing surfaces assigned to one another can occur at high speeds of rotation, thereby making it possible for the sensitive bearing surfaces to be destroyed and making a replacement of the bearing necessary.

A turbocharger of an internal combustion engine having a gas-static and gas-dynamic bearing is described in German Patent No. DE 87 17 441 U1. In the case of such a turbocharger for internal combustion engines, with which a pressure increase of about 1 bar is generally achieved, the running behavior is supposed to be improved. For this purpose, a gas-static and gas-dynamic radial bearing is provided, which has spring elements that are arranged in overlapping manner and spread out as bearing surfaces. Because of the low pressure difference generated by the turbocharger and the bearing surfaces formed by the spring elements, which can elastically lie against the rotor, radial bearing of the shaft takes place almost exclusively hydrodynamically at high speeds of rotation. The arrangement, which is intended as a turbocharger for internal combustion engines, is therefore sensitive to pressure surge stresses.

SUMMARY OF THE INVENTION

It is therefore an object of the invention to provide a turbomachine having the characteristics described initially, in which the shaft is mounted in the shaft housing in a robust, low-maintenance, and simple manner.

Proceeding from a turbomachine having the characteristics described initially, this task is accomplished, according to the invention, in that the bearings for axial and radial bearing of the shaft are configured as hydrostatic, gas-lubricated bearings. The shaft is mounted by means of the hydrostatic, gas-lubricated bearings in such a manner that the bearing effect is independent, or at least extensively independent of the speed of rotation of the shaft, thereby guaranteeing sufficient support of the shaft even during startup of the turbomachine, and good rigidity and low sensitivity to pressure surge stresses independent of the speed of rotation. The pressure in the connector to the compressed gas line is at least 5 bar greater than the pressure in the region of the ventilation connector. Since the bearing has a portion of the working gas applied to it, a separate compressed gas source is not provided, according to the invention. In comparison with a hydrodynamic, gas-lubricated bearing, the hydrostatic bearing is characterized by great rigidity and a lower sensitivity to pressure surge stresses. Fundamentally, the hydrostatic bearings can have a certain dynamic component, at high speeds of rotation, as a function of the design configuration. However, since the formation of a gas cushion and a comparatively great bearing gap are provided in the case of the hydrostatic bearings, the dynamic component of the support force is typically less than 20%, preferably less than 10%, even at the maximal speed of rotation. The dynamic component of the support force can be determined by a comparison of the forces that act on a bearing in the rest state, in total, and at the maximal speed of rotation. While elastic spring, sheet-metal, or film elements are preferably used in the case of hydrodynamic bearings, which can rest resiliently against the rotor in order to form the smallest possible bearing gap of typically a few μm, it is usually provided, within the scope of the invention, that the bearing surfaces are formed from a rigid material. Preferably, no additional bearings are provided, so that the entire shaft is mounted hydrostatically. The invention is based on the recognition that the bearing properties can be improved both at low speeds of rotation and at high speeds of rotation, by means of an exclusively or almost exclusively hydrostatic bearing method. In order to achieve this, however, a pressure difference of at least 5 bar must be present between the connector to the compressed gas lines and the region of the ventilation connector, according to the invention. The bearing arrangement, which is particularly simple in design, reliable, and robust, is particularly suitable for cryogenic applications. These include, without restriction, the cryogenic fractionation of air, and the liquefaction of its components, as well as the liquefaction and re-liquefaction of hydrocarbon gases, for example natural gas.

Because of the simple, robust configuration of the bearing, the risk of bearing damage is minimized. The embodiment according to the invention is particularly suitable for turbomachines having a simple construction, or for oil-free turbomachines in which a fluid-lubricated bearing is not a possibility.

In one embodiment, the portion of the working gas that is guided through the compressed gas line is passed out of the turbomachine after it has flowed through the bearings, through the ventilation connector. Such an embodiment can be particularly advantageous if only a small portion of the working gas is needed for lubricating the bearing. Preferably, however, the ventilation connector is connected with a low-pressure region of the turbomachine, and thus the portion of the working gas utilized for lubrication of the bearing remains in the turbomachine. Within the framework of this embodiment, it is particularly possible to construct the turbomachine so that it is hermetically sealed, at least to a great extent, with no seals or only simple seals being required. In this case, operational safety can be greatly increased, particularly in the case of toxic, combustible, or explosive working gases, and environmental contamination due to a gas leak can be reliably prevented.

In another embodiment, a rotor is disposed at each end of the shaft. One rotor is assigned to a compressor stage and the other rotor to an expansion stage. In this connection, the compressed gas line can be connected with the high-pressure region in advance of the expansion stage, and the ventilation connector can be connected with the low-pressure region in advance of the compressor stage. Fundamentally, however, the compressed gas line can also be connected with the high-pressure region of the compressor, and the ventilation connector can be connected with the outlet of the turbine or with a ventilation outlet.

The build-up of a support-capable air cushion can take place by way of throttling at the exit of the bearing gap and/or by way of throttle points at the entry of the gas to the bearing gap. The bearings can have pockets at the bearing surfaces, which have the portion of the working gas applied to them by the connector to the compressed gas line. In this connection, the pockets are configured in such a manner that they spring back, proceeding from the adjacent inner surfaces of the housing. Around the circumference, radially circumferential pockets, ring-shaped pockets, or several pockets separated from one another can be provided. The working gas is passed into the pockets by way of inlet nozzles; an air cushion, i.e. a cushion, forms in the pockets; the shaft of the turbomachine is supported on this cushion. Within the pockets, the pressure is preferably constant or at least essentially constant. Furthermore, bearing elements can also be provided that have micronozzles distributed over the surface. In a preferred embodiment of the invention, the shaft is mounted with at least two bearings that are each configured as combined axial/radial bearings. In order to guarantee secure mounting of the shaft, a sufficiently great excess pressure must act on the hydrostatic bearings. Depending on the precise configuration of the bearings, the pressure drop over each of the bearings can lie between 10 bar and 30 bar, for example. In general, the pressure drop over each of the bearings is typically greater than 5 bar, preferably greater than 10 bar, and particularly preferably greater than 20 bar. Accordingly, the pressure in the connector to the compressed gas line is also greater, by at least 5 bar and preferably by 10 bar to 30 bar, than the pressure in the region of the ventilation connector.

In a preferred embodiment of the invention, the compressed gas line has a pressure regulator or amount flow regulator. Pressure variations in the pressure region of the turbomachine with which the compressed gas line is connected can be compensated by means of such a regulator, and the bearing properties can be regulated as a function of the load. In particular, the stiffness and the damping behavior of the bearing can be adjusted to an optimal value with the pressure regulator, in accordance with the requirements. It is particularly preferred that the pressure regulator or amount flow regulator can be controlled electronically, and that it is connected with an assigned control device, which allows flexible adaptation of the pressure or the amount of flow during operation, proceeding from measurement signals, control signals and/or manual input.

In order to protect the bearings from contamination and therefore from possibly increased wear, a filter is preferably disposed in the compressed gas line. The bearing surfaces connected with the compressed gas line are preferably formed in the shaft housing, thereby achieving a particularly simple construction.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views:

FIG. 2 shows a detail view of a hydrostatic, gas-lubricated bearing configured as an axial/radial bearing.

DETAILED DESCRIPTION OF THE PREFERRED EMBODIMENT

Figure 1:
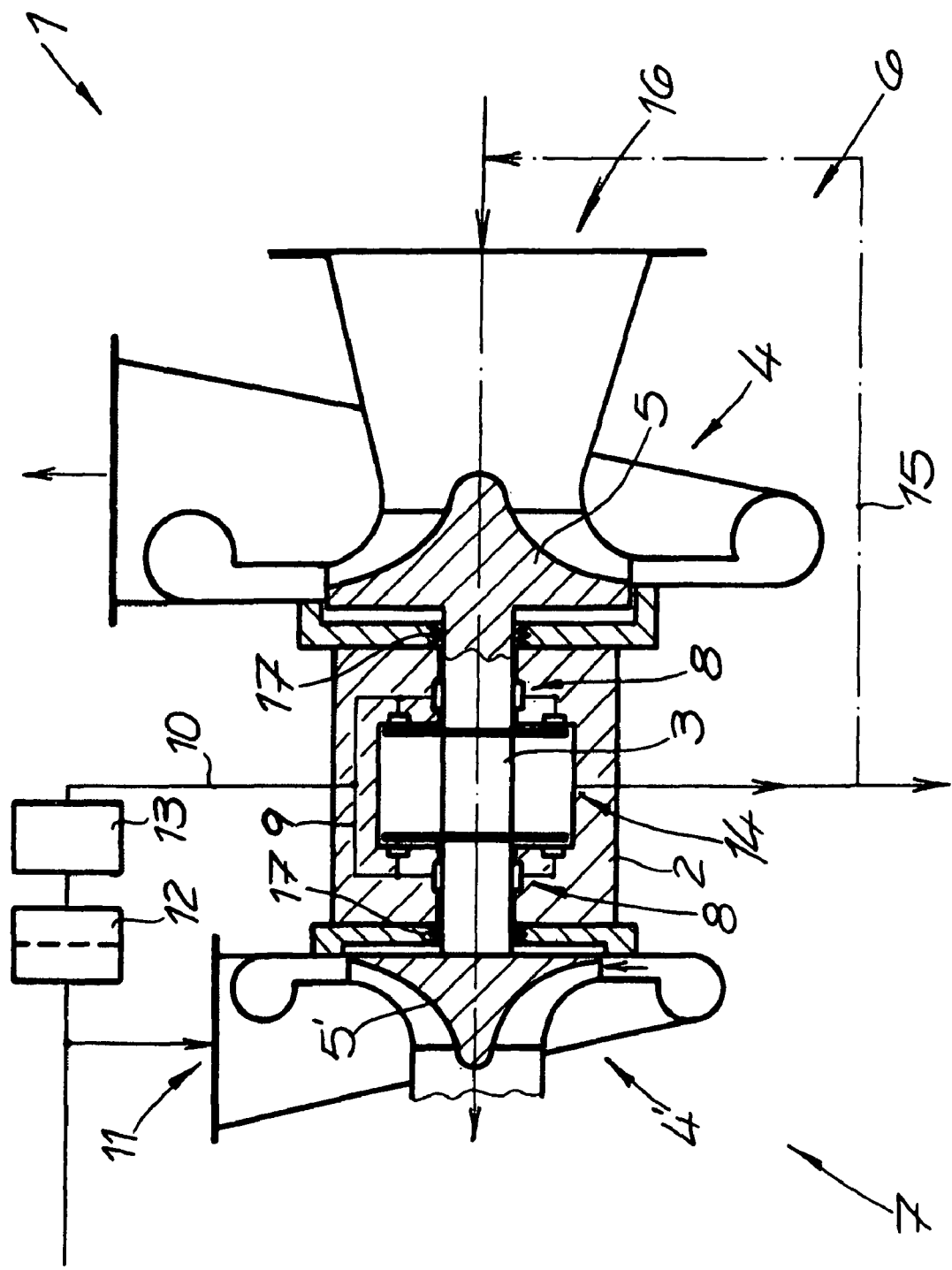
FIG. 1 shows a cross-sectional view of an embodiment of the turbomachine according to the invention.

Referring now in detail to the drawings, FIG. 1 shows a turbomachine 1 having a shaft 3 disposed in a shaft housing 2, and rotors 5, 5' disposed on both ends of the shaft, in overhung manner, each in a rotor housing 4, 4'. The one rotor 5 is assigned to a compressor stage 6, and the other rotor 5' is assigned to an expansion stage 7 of turbomachine 1. Shaft 3 is mounted in shaft housing 2 by means of hydrostatic, gas-lubricated bearings 8. Bearings 8 have a connector 9 to a compressed gas line 10. The other end of compressed gas line 10 is connected with high-pressure region 11 in advance of expansion stage 7. A portion of the working gas is guided from high-pressure region 11 in advance of expansion stage 7, through compressed gas line 10, to bearings 8. In order to avoid contamination of bearings 8, and to allow regulation of the bearing properties, in this process the portion of the working gas flows through a filter 12 and a pressure regulator or an amount flow regulator 13. After having flowed through bearings 8, the portion of the working gas is guided to low-pressure region 16 in advance of compressor stage 6, by way of a connecting line 15, by a ventilation connector 14 of shaft housing 2. A shaft seal arrangement 17 is provided between rotors 5, 5' and assigned bearings 8, in each instance.

FIG. 2 shows a bearing 8 configured as an axial/radial bearing, in accordance with FIG. 1, in a detail view. The working gas taken from the pressure region of turbomachine 1 is guided from compressed gas line 10 to bearings 8 by way of a branched connector 9, and blown into pockets 19, 19' for the radial bearing effect and the axial bearing effect, by means of nozzles 18. Pockets 19 for the radial bearing effect interact directly with an assigned surface of shaft 3, and pockets 19' for the axial bearing effect interact directly with an assigned bearing disk 20 disposed on shaft 3. In pockets 19, 19', the working gas that is blown in forms cushions on which shaft 3 of turbomachine 1 is supported. To guarantee a reliable bearing effect, the pressure in the region of connector 9 to compressed gas line 10 is typically 10 to 20 bar greater than the pressure in the region of ventilation connector 14, and the pressure drop essentially occurs over the bearings 8.

Accordingly, while only a few embodiments of the present invention have been shown and described, it is obvious that many changes and modifications may be made thereunto without departing from the spirit and scope of the invention.

What is claimed is:

1. A turbomachine comprising:
    a shaft mounted in a shaft housing, said housing having a ventilation connector which is connected with a low pressure region of the turbomachine;
    at least one rotor disposed in a rotor housing, said rotor housing being overhung at one end of the shaft, for compression, expansion, or transport of a working gas; and
    at least two hydrostatic, gas-lubricated bearings for mounting the shaft in the shaft housing, said bearings having a connector to a compressed gas line that is connected with a pressure region of the turbomachine,
    wherein the bearings are each configured as combined axial/radial bearings,
    wherein a portion of working gas that is passed from the pressure region through the compressed gas line is applied to the bearings by way of a branched connector and blown into pockets for a radial bearing effect and axial bearing effect, by means of nozzles,
    wherein the pockets for the radial bearing effect interact directly with an assigned surface of the shaft and the pockets for the axial bearing effect interact directly with an assigned bearing disc disposed on the shaft, thereby guaranteeing support of the shaft even during startup of the turbomachine, and guaranteeing good rigidity and low sensitivity to pressure surge stresses independent of the speed of rotation,
    and wherein pressure in the connector to the compressed gas line is at least 10 to 20 bar greater than the pressure in the region of the ventilation connector and the pressure drop essentially occurs over the bearings.

2. A turbomachine according to claim 1, wherein there are two rotors, one disposed at each end of the shaft, and wherein one of said rotors is assigned to a compressor stage and the other of said rotors is assigned to an expansion stage of the turbomachine.

3. A turbomachine according to claim 2, wherein the compressed gas line is connected with a high-pressure region in advance of the expansion stage, and the ventilation connector is connected with a low-pressure region in advance of the compressor stage.

4. A turbomachine according to claim 1, further comprising a filter disposed in the compressed gas line.

5. A turbomachine according to claim 1, wherein the compressed gas line has a pressure regulator or an amount flow regulator, said pressure regulator or amount flow regulator being connected with an assigned control device which allows flexible adaption of the pressure or the amount of flow during operation.

* * * * *